(12) United States Patent
Arguelles et al.

(10) Patent No.: US 11,170,904 B2
(45) Date of Patent: Nov. 9, 2021

(54) SYSTEM AND METHOD FOR IMPROVING SENSITIVITY OF A SIPPING SYSTEM

(71) Applicant: DOMINION ENGINEERING, INC., Reston, VA (US)

(72) Inventors: David Arguelles, Herndon, VA (US); Robert D. Varrin, Jr., Reston, VA (US)

(73) Assignee: Dominion Engineering, Inc., Reston, VA (US)

( * ) Notice: Subject to any disclaimer, the term of this patent is extended or adjusted under 35 U.S.C. 154(b) by 218 days.

(21) Appl. No.: 15/104,971

(22) PCT Filed: Jan. 16, 2015

(86) PCT No.: PCT/US2015/011752
§ 371 (c)(1),
(2) Date: Jun. 15, 2016

(87) PCT Pub. No.: WO2015/109182
PCT Pub. Date: Jul. 23, 2015

(65) Prior Publication Data
US 2017/0032854 A1  Feb. 2, 2017

Related U.S. Application Data

(60) Provisional application No. 61/928,301, filed on Jan. 16, 2014.

(51) Int. Cl.
*G21C 17/07*  (2006.01)

(52) U.S. Cl.
CPC .................... *G21C 17/07* (2013.01)

(58) Field of Classification Search
CPC .......... G21C 17/06; G21C 17/07; G21F 9/02; G21F 9/04; B01D 2311/13; B01D 2311/14

(Continued)

(56) References Cited

U.S. PATENT DOCUMENTS 4,034,599 A * 7/1977 Osborne ................ G21C 17/07
376/253
5,235,624 A * 8/1993 Bordy .................... G21C 17/07
376/245

(Continued)

FOREIGN PATENT DOCUMENTS

CN          85109072 A     6/1987
CN          1603254 A      4/2005

(Continued)

OTHER PUBLICATIONS

Lu et al., CN103405945, an English machine translation is retrieved online on Oct. 29, 2018 at URL: https://worldwide.espacenet.com/publicationDetails/biblio?CC=CN&NR=103405945A&KC=A&FT=D&ND=3&date=20131127&DB=&locale=en_EP. (Year: 2013).*

(Continued)

*Primary Examiner* — Sharon M Davis
(74) *Attorney, Agent, or Firm* — Pillsbury Winthrop Shaw Pittman LLP

(57) ABSTRACT

A method and system detects failures in nuclear fuel assemblies (600). A water treatment device degasses/removes fission gases from water used in the canister (500) of a vacuum sipping device (30). A sipping procedure then detects a failure in a fuel assembly in the canister. The degassing improves a signal-to-noise ratio of the detector used during the sipping process, and improves the failure detection sensitivity of the system. Additionally and/or alternatively, gas may be recirculated through the canister water before the vacuum is applied so that fission gas concentration in the recirculating gas reaches a baseline equilibrium with the canister water. The vacuum is thereafter applied and the sipping procedure proceeds such that an increase in detected radioactivity over the baseline equilibrium indicates a leak in the fuel assembly.

5 Claims, 4 Drawing Sheets

(58) Field of Classification Search
USPC .......................................................... 376/253
See application file for complete search history.

(56) References Cited

U.S. PATENT DOCUMENTS

| | | | |
|---|---|---|---|
| 5,457,720 A | 10/1995 | Snyder et al. | |
| 5,546,435 A | 8/1996 | Collin et al. | |
| 2002/0075984 A1* | 6/2002 | Knecht | G21C 17/07 376/253 |
| 2004/0025696 A1 | 2/2004 | Varrin, Jr. et al. | |
| 2012/0055330 A1 | 3/2012 | Konopka | |

FOREIGN PATENT DOCUMENTS

| | | |
|---|---|---|
| CN | 202034074 U | 11/2011 |
| JP | S51-005486 | 1/1976 |
| JP | S52-106096 | 9/1977 |
| JP | S58-062596 | 4/1983 |
| JP | 63-266395 | 11/1988 |
| JP | 2000-2787 | 1/2000 |
| JP | 2000-088989 | 3/2000 |
| JP | 2000-162373 | 6/2000 |
| JP | 2005-265856 | 9/2005 |
| JP | 2006-29930 | 2/2006 |
| JP | 2012-052818 | 3/2012 |

OTHER PUBLICATIONS

Yasuyuki et al., JPS63266395 (A), an English machine translation is retrieved online on Oct. 24, 2018 at URL: https://worldwide.espacenet.com/publicationDetails/biblio?II=0&ND=3&adjacent=true&locale=en_EP&FT=D&date=19881102&CC=JP&NR=S63266395A&KC=A. (Year: 1988).*
Machine Translation JP 63-266395 (Year: 1988).*
Westinghouse Product Fly Sheet, "Vacuum Canister Sipping Services," NS-FS-0052 (75370) Apr. 2009.
"Membrane Contactors: An Introduction to the Technology," Ultrapure Water® May/Jun. 1996—UP130427.
International Search Report as issued for corresponding International Application No. PCT/US2015/011752, dated Aug. 20, 2015.
International Preliminary Report on Patentability issued for corresponding International Application No. PCT/US2015/011752, dated Jul. 28, 2016.
Office Action issued in corresponding Chinese Patent Application No. 201580004792.2, dated May 3, 2017.
Office Action Issued in corresponding Japanese Patent Application No. 2016-543221, dated Oct. 2, 2018.
Final Office Action issued in corresponding Japanese Patent Application No. 2016-543221, dated Sep. 17, 2019.
Notice of Preliminary Rejection issued in corresponding Korean Patent Application No. 10-2016-7021817, dated Dec. 10, 2020.
Office Action issued in corresponding Canadian Patent Application No. 2,936,654, dated Feb. 22, 2021.

* cited by examiner

SYSTEM AND METHOD FOR IMPROVING SENSITIVITY OF A SIPPING SYSTEM

CROSS-REFERENCE TO RELATED APPLICATIONS

This application is the U.S. National Phase of PCT/US2015/011752, filed Jan. 16, 2015, which claims the benefit of priority from U.S. Provisional Application No. 61/928,301, filed Jan. 16, 2014, titled "System and Method For Improving Sensitivity Of A Sipping System," the entire contents of which are hereby incorporated by reference herein.

BACKGROUND OF THE INVENTION

1. Field of the Invention

The present invention relates generally to vacuum canister sipping systems that are designed to detect failures in nuclear fuel assemblies.

2. Description of Related Art

Vacuum canister sipping detects fuel failures in nuclear fuel assemblies by isolating a fuel assembly in a chamber/canister and reducing the ambient pressure in the chamber to draw out fission gas through the cladding failures in the fuel elements of the assembly. The gas bubbles are collected at the top of the chamber and passed through a radiation detector (e.g., scintillation detector) to detect the presence of fission gas. Assemblies that give off higher than expected fission gas activity are identified as failed and leaking in this manner.

Known vacuum canister sipping systems are described, for example, in Westinghouse Product Fly Sheet, "Vacuum Canister Sipping Services," NS-FS-0052 (75370) April 2009. U.S. Pat. Nos. 5,457,720 and 5,546,435 disclose other known methods for detecting failures in fuel assemblies.

SUMMARY OF EMBODIMENTS OF THE INVENTION

A limitation of existing vacuum sipping systems is that the application of vacuum during the sipping cycle causes dissolved gasses, radioactive or otherwise, in the canister water to come out of solution and contribute to the radioactivity of the gas sample being detected. It can therefore be challenging to detect faint fuel leak signatures under pool water conditions of high and/or fluctuating ambient dissolved fission gas content.

One or more embodiments provide a method and/or apparatus that extracts dissolved fission gas from the water used in the sipping canister prior to the application of vacuum to the fuel, thus improving the detection sensitivity of the system. The extraction of fission gasses from the canister water prior to the start of the detection cycle can be performed for the purpose of reducing background fission gas concentration and improving the signal to noise ratio of the detection system. Alternatively, extraction of the fission gasses can be performed for the purpose of regularly measuring the fission gas concentration in the water, thus ensuring a reliable standard of "background" for each sipping cycle. The background gas extraction may be accomplished so as not to cause fission gas escape from a leaking fuel rod within an assembly being tested. The subsequent application of vacuum during the conventional sipping cycle steps draws out fission gas through fuel leaks and is detectable as a separate indication from that of the background fission gas.

One or more embodiments provide a method for detecting a failure in a nuclear fuel assembly in a fuel pool, the method including: placing the nuclear fuel assembly into a canister of a canister vacuum sipping device disposed in the fuel pool; removing fission gases from fuel pool water to create degassed water; and after said placing of the nuclear fuel assembly into the canister, undertaking a vacuum sipping procedure using the canister sipping device to detect a failure in the fuel assembly by detecting fission gas leaking from the fuel assembly while the degassed water is disposed in the canister.

One or more of these embodiments may further include flushing the degassed water through the canister after said placing of the nuclear fuel assembly into the canister and before said undertaking, thereby displacing at least a portion of fuel pool water disposed within the canister with the degassed water, wherein said flushing reduces a concentration of fission gases in water disposed within the canister.

According to one or more of these embodiments, during the flushing, a volume of the degassed water being flushed into the canister is at least twice a volume of the canister.

According to one or more of these methods, the removing includes filtering the fuel pool water through a gas transfer membrane device that extracts fission gases out of the fuel pool water.

According to one or more of these embodiments, the removing includes applying vacuum pressure to a strip gas being used with the gas transfer membrane device such that the gas transfer membrane device filters both fission gas and dissolved air out of the fuel pool water.

According to one or more of these embodiments, the removing includes introducing sparge gas into the canister such that dissolved fission gasses in fuel pool water disposed within the canister diffuse into the introduced sparge gas, and removing at least a portion of the introduced sparge gas from the canister. According to one or more of these embodiments, the removing of the fission gases from fuel pool water may occur after the placing of the nuclear fuel assembly into the canister and before the undertaking of the vacuum sipping procedure.

One or more of these methods may also include maintaining a pressure within the canister at local ambient fuel pool pressure conditions during the introducing of the sparge gas into the canister.

According to one or more of these embodiments, a portion of the sparge gas that was introduced into the canister is collected from the canister and its radioactivity measured to define a background level for comparison against the radioactivity measured during the vacuum sipping procedure.

According to one or more of these embodiments, a supply of sparge gas used during the introducing has a lower fraction of fission gas than a dissolved gas mixture in fuel pool water disposed in the canister prior to the introducing.

One or more embodiments provide a canister sipping system that includes: a canister vacuum sipping device including a canister, the canister vacuum sipping device being configured to detect a failure in a nuclear fuel assembly disposed in the canister by detecting fission gas leaking from the fuel assembly during a vacuum sipping procedure of the canister vacuum sipping device; and a water treatment device connected to the canister and configured to remove fission gases from fuel pool water to create degassed water, wherein the water treatment device is configured to provide the degassed water within the canister prior to undertaking of the vacuum sipping procedure.

According to one or more of these embodiments, the water treatment device includes: a gas transfer membrane device that is configured to extract fission gases out of fuel pool water that has been extracted from a fuel pool to form the degassed water, and a canister flushing mechanism that is configured to flush the degassed water through the canister after the nuclear fuel assembly is placed into the canister, thereby displacing at least a portion of the fuel pool water disposed within the canister with the degassed water.

According to one or more of these embodiments, the canister flushing mechanism is configured such that a volume of the degassed water being flushed into the canister is at least twice a volume of the canister.

According to one or more of these embodiments, the water treatment device includes: a sparge gas supply and inlet connected to the canister, the water treatment device being configured to introduce sparge gas into the canister via the inlet such that dissolved fission gasses in fuel pool water disposed within the canister diffuse into the introduced sparge gas, and a sparge gas outlet connected to the canister, the outlet being configured to allow the introduced sparge gas to exit the canister, wherein the water treatment device is configured to remove the fission gases from fuel pool water after the nuclear fuel assembly is placed into the canister and before the undertaking of the vacuum sipping procedure.

According to one or more of these embodiments, the system is configured to maintain pressure within the canister at a local ambient fuel pool pressure during the introducing of the sparge gas into the canister.

According to one or more of these embodiments, the canister vacuum sipping device is configured to collect a portion of the sparge gas that was introduced into the canister, and measure a radioactivity of collected sparge gas to define a background level for comparison against a radioactivity measured during the vacuum sipping procedure.

According to one or more of these embodiments, the sparge gas supply has a lower fraction of fission gas than a dissolved gas mixture in fuel pool water disposed in the canister prior to operation of the water treatment device.

One or more embodiments provide a method for detecting a failure in a nuclear fuel assembly in a fuel pool, the method including: placing the nuclear fuel assembly into a canister of a canister vacuum sipping device disposed in the fuel pool; recirculating a carrier gas through fuel pool water disposed in the canister, thereby causing fission gasses in the fuel pool water in the canister to diffuse into the carrier gas being recirculated; and undertaking a vacuum sipping procedure using the canister sipping device to detect a failure in the fuel assembly by detecting fission gas leaking from the fuel assembly.

According to one or more of these embodiments, the method also includes, before the undertaking, detecting with a radiation detector of the canister vacuum sipping device, a radiation level in the carrier gas to define a baseline radiation level, wherein the using of the canister sipping device to detect a failure in the fuel assembly includes comparing the baseline radiation level to a radiation level detected during the vacuum sipping procedure.

According to one or more of these embodiments, the recirculating continues until a rate of increase in radiation level in the recirculating carrier gas falls below a predetermined threshold, and the undertaking occurs after the rate of increase in radiation level in the recirculating gas falls below the predetermined threshold.

One or more embodiments provide a canister sipping system that includes: a canister vacuum sipping device including a canister and a radiation detector, the canister vacuum sipping device being configured to detect a failure in a nuclear fuel assembly disposed in the canister by detecting fission gas leaking from the fuel assembly during a vacuum sipping procedure of the canister vacuum sipping device; a gas recirculation device configured to recirculate a carrier gas through a loop that includes the canister, a pump, and the detector of the canister vacuum sipping device, wherein the pump is configured to recirculate gas through the loop; and a carrier gas supply connected to the loop and configured to supply carrier gas to the loop.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

All closed-ended (e.g., between A and B) and open-ended (greater than C) ranges of values disclosed herein explicitly include all ranges that fall within or nest within such ranges. For example, a disclosed range of 1-10 is understood as also disclosing, among other ranged, 2-10, 1-9, 3-9, etc.

BRIEF DESCRIPTION OF THE DRAWINGS

For a better understanding of embodiments of the present invention as well as other objects and further features thereof, reference is made to the following description which is to be used in conjunction with the accompanying drawings, where.

DETAILED DESCRIPTION

Canister sipping equipment can detect a leaking nuclear fuel assembly only when the level of activity released by the assembly is noticeably higher than the variation in background radiation. There are multiple sources of background noise that can degrade the minimum detection threshold of the equipment (e.g. presence of dissolved fission gas in the fuel pool and sipping canister, external gamma radiation to the radiation detector, contamination of the radiation detector, etc.).

For example, during vacuum canister sipping procedures, both the fuel assembly being tested and the vacuum canister itself are disposed in a fuel pool at the nuclear plant. The water in the fuel pool typically contains some fission gases (e.g., from failed/leaking fuel assemblies in the pool). When such fission-gas-containing fuel pool water is present in the vacuum canister during the sipping process, the ambient fission gas reduces the sensitivity of the system to detecting fission gas that is leaking from the tested fuel assembly, as opposed to fission gas that is present in the ambient fuel pool environment. The ambient fission gas in the fuel pool may therefore impair the accuracy of failure detection or the ability to detect small failures in the fuel assembly being tested.

For some types of reactors (e.g., PWR reactors), the fuel pool water is typically borated, while in other types of reactors (e.g., BWR reactors), the fuel pool water is not borated. Various embodiments of the present invention are applicable to reactors that use borated and/or unborated water in the fuel pool.

As used herein, the term "fuel pool" and its derivatives includes similar elements of a nuclear plant where equipment can be installed and that are flooded with water to enable fuel movement. For example, the refueling cavity, transfer canal, cask loading pit, etc. are all considered to be a "fuel pool" as that term is used herein. Accordingly, the term "fuel pool water" includes the water disposed in any such "fuel pool."

To increase failure detection sensitivity, the measurement noise sources may be reduced. According to one or more embodiments, dissolved fission gas is filtered out of the pool water that is used in the canister to reduce this significant source of measurement noise.

Reduction of dissolved fission gas in the canister, which is especially high after processing a leaking assembly, can be accomplished by pumping the water out of the canister so that it is replaced by water from the pool. This flushing reduces the amount of dissolved fission gas in the chamber back to the normal background of dissolved fission gasses in the bulk pool inventory. However, it is possible for the level of dissolved fission gasses in the bulk pool to be very high (e.g. if there are many leaking assemblies during an outage), which results in elevated background levels even after flushing with water from the pool.

Figure 1:
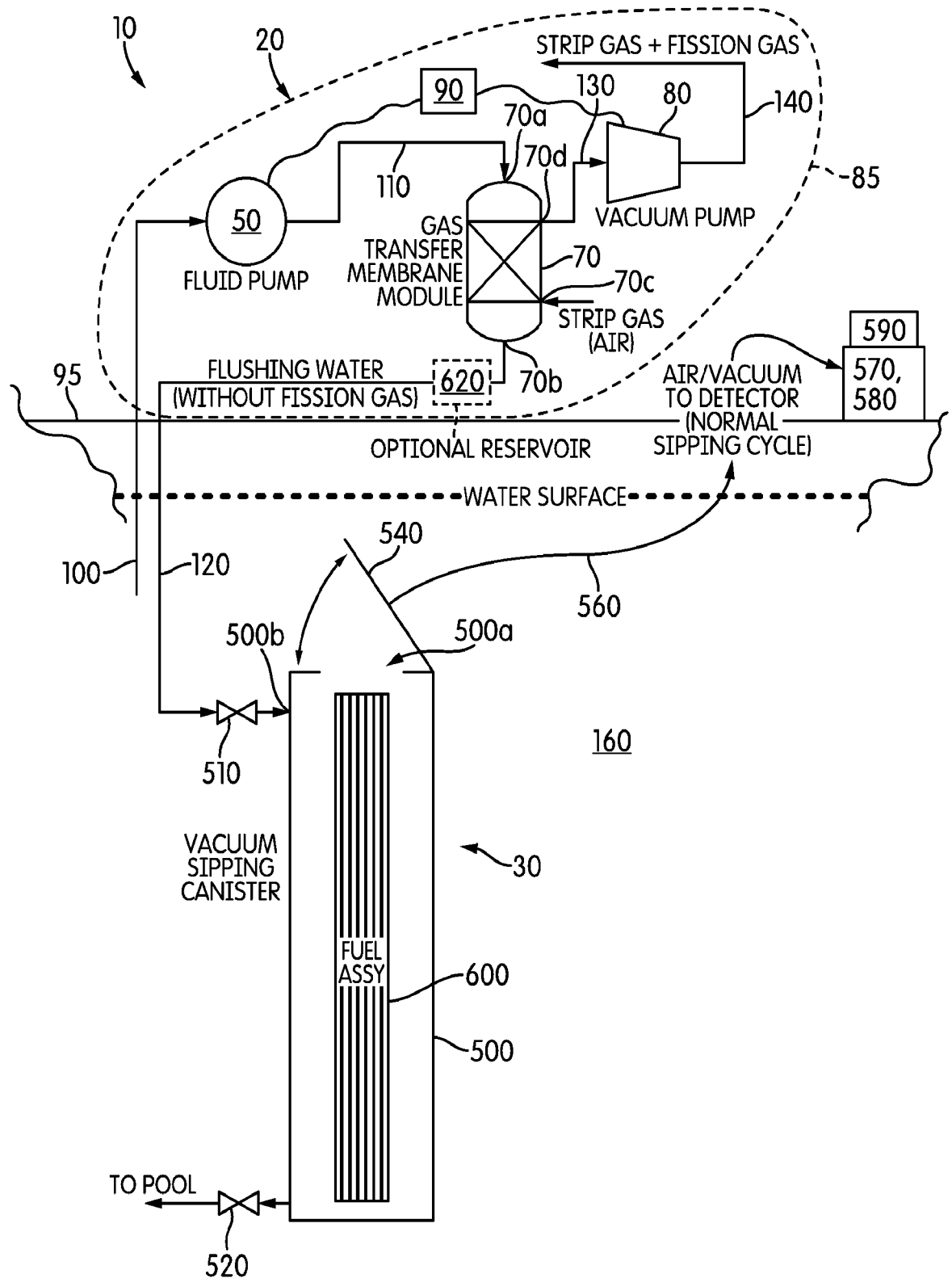
FIG. 1 is a block-diagram of a vacuum canister sipping system according to an embodiment in which fission gasses are removed from the canister water supply.

FIG. 1 illustrates a vacuum canister sipping system 10 according to an embodiment of the present invention. The system 10 includes a water treatment device 20 connected to a sipping device 30.

As shown in FIG. 1, the water treatment device 20 includes a recirculating pump 50, one or more gas transfer membrane modules 70 (see also FIG. 2), a vacuum pump 80, a control system 90, an inlet water passageway 100 that leads to an inlet of the pump 50, an intermediate water passageway 110 connecting an outlet of the pump 50 to an aqueous stream inlet 70*a* of the module 70, a water outlet passageway 120 connecting an aqueous stream outlet 70*b* of the module 70 to an inlet of the sipping device 30, a strip gas inlet passage or port 70*c* connecting to a strip gas inlet of the module 70, an intermediate gas passageway 130 connecting a strip gas outlet 70*d* of the module 70 to an inlet of the vacuum pump 80, and a strip gas outlet passageway 140 connected to an outlet of the pump 80. The discharged air (including the fission gasses) from the vacuum pump 80 is directed either to a plant ventilation return or other location. For example, the plant may wish to direct the fission-gas-laden strip gas from the passageway 140 to a waste gas treatment system.

According to various embodiments, the relative positions of components of the water treatment device 20 may be switched without deviating from the scope of the present invention. For example, the pump 50 may be disposed anywhere along the passageways 100, 110, 120 and/or be disposed downstream from the module 70. The pump 50 could alternatively be dispose downstream from the canister 500, for example downstream from the valve 520, and suction water through the system 10. Similarly, the pump 80 could alternatively be disposed upstream from the module 70 and pump strip gas to the inlet 70*c*.

As shown in FIG. 1, many or all of the components of the water treatment device 20 may be mounted to a common frame 85 such as a skid or palette that provides for easy movement of the device 20. To use the device 20, the device and frame 85 may be positioned on a floor 95 of the nuclear power plant next to the fuel pool 160 to facilitate easy connection of the passageway 100 with the fuel pool 160 and connection of the passageway 120 with the sipping device 30. According to various alternative embodiments, the device 20 may alternatively be disposed on multiple frames without deviating from the scope of the present invention. Additional parts of the system 10 such as components of the sipping device 30 (e.g., the pump 570, detector 580, the control system 590) may also be mounted to the frame 85 to provide an easily accessible, compact system 10.

As shown in FIG. 1, during operation of the water treatment device 20, the pump 50 moves ambient water from the fuel pool 160 sequentially through the passageway 100, the pump 50, the passageway 110, the module 70, and the passageway 120 to the sipping device 30. At the same time, the pump 80 sucks strip gas (e.g., ambient/local air around the fuel pool or air from another source) through the inlet 70*c*, the module 70, the passageway 130, the pump 80, and the outlet passageway 140.

Figure 2:
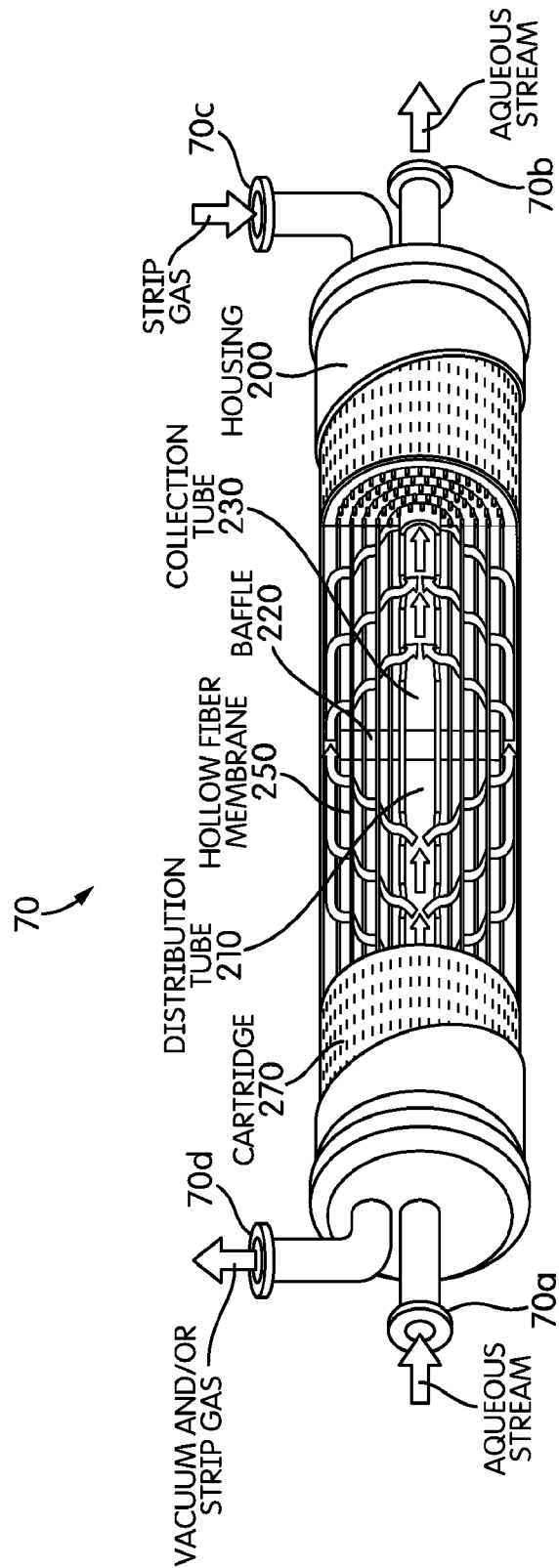
FIG. 2 is a partially-cut-away perspective view of a gas transfer membrane module of the system of FIG. 1.

Turning to the operation of the module 70, as shown in FIG. 2, the module 70 comprises an enclosed housing 200 through which the water flows from the aqueous inlet 70*a* to the aqueous outlet 70*b*. A distribution tube 210 distributes the water flow outwardly from the inlet 70*a*. The water then passes around a central baffle 220, and back to a collection tube 230 that leads to the outlet 70*b*. The strip gas flows from the strip gas inlet 70*c* through a plurality of hollow fiber membranes 250 and out through the outlet 70*d*.

As pool water flows around the membranes 250 inside the module 70 and strip gas passes through the membranes 250, the membranes 250 allow exchange of gases between the water and strip gas, resulting in a discharge dissolved gas composition in the water that closely matches the composition of the incoming strip gas (i.e., nearly free of fission gas). As a result, fission gas in the incoming pool water is filtered out of the water and into the strip gas stream. Consequently, the module 70 removes fission gas from the incoming pool water from the passageway 110 and discharges clean/degassed water with less fission gas into the passageway 120. The removed fission gas combines with the strip gas in the module 70 and is expelled through the outlet 70*d*.

According to various embodiments, the module 70 and membranes 250 remove fission gases, but do not remove boron from borated fuel pool water (if the fuel pool water is borated according to various embodiments). Accordingly, the clean/degassed water being used to flush the canister 500 remains borated (in embodiments in which the fuel pool water was already borated), and does not impact the boron concentration in the fuel pool. In embodiments in which the fuel pool water is borated, if fresh clean water, rather than borated pool water, were used to flush a canister 500, the water would either be borated before use, or used in an unborated state. Unborated water is preferably not used in fuel pools for certain types of reactors due to significant criticality control issues.

In the illustrated embodiment, the tubes 210, 230, baffle 220, and membranes 250 are part of a replaceable cartridge 270. The housing 200 may be opened to replace a used or fouled cartridge 270 with a fresh cartridge.

In the illustrated embodiment, the membranes 250 comprise hollow fiber membranes. However, according to alternative embodiments, the membranes 250 may take any other suitable shape (e.g., sheet membranes that separate the strip gas regions from the water regions within the module 70).

According to various embodiments, the membranes 250 may comprise any suitable gas transfer membrane that permits transfer of fission gases therethrough without permitting water transfer. For example, Liqui-Cel® Membrana Gas Transfer Modules may be used as the membranes 250. See "Membrane Contactors: An Introduction to the Technology," Ultrapure Water® May/June 1996—UP130427. "BATMAN—Best Available Technique Minimising All Nuclides," IVL Swedish Environmental Research Institute, Apr. 18, 2006, discloses other membranes that may be used as the membrane 250.

In the illustrated embodiment in FIGS. 1-2, a single module 70 is shown. However, multiple modules 70 may be used without deviating from the scope of the present invention. Multiple modules 70 may be arranged in parallel and/or series between the passageways 110, 120. Parallel modules 70 may be used to increase the flow rate of water through the water treatment device 20. Serial modules 70 may be used to increase the amount of fission gas removed from the water by the water treatment device 20.

The module(s) 70 may be sized to collectively provide once-through processing at a liquid flow rate of approximately 25-500, 25-300, and/or 50-100 gallons/minute, which may be sufficient to turn over the full volume of the sipping canister 500 in approximately 1-2 minutes and/or less than 5, 4, 3, 2, and/or 1 minutes. An additional 1-2 minutes of flushing can be performed at the start of each cycle without a noticeable impact to the overall throughput of the sipping system 10.

According to various embodiments, the strip gas being used in the module 70 is kept at a slight to moderate vacuum pressure. This vacuum causes dissolved air and other gases in the water (in addition to fission gas) to diffuse into the strip gas. Removal of dissolved air from the water that is used in the canister 500 during the sipping procedure improves the sensitivity of the sipping procedure to detecting small leaks in the fuel assembly 600. In particular, by reducing the fraction of dissolved air in the canister water, less air is released from the canister water into the air bubble at the top of the canister 500 during the sipping procedure. As a result, the air bubble being sampled will comprise a relatively larger portion of leaked fission gas because the air bubble is not being diluted as much by air being released from the water. The larger concentration of any leaked fission gas in the air bubble being sampled by the detector 580 facilitates more accurate/sensitive detection of leaks.

The control system 90 includes manual and/or automatic controls to control the pumps 50, 80, and may include additional sensors (e.g., flow/pressure sensors) that are used to determine and adjust the devices (e.g., pumps 50, 80) being controlled by the control system 90.

As shown in FIG. 1, the sipping device 30 includes a canister 500. The canister 500 has a fuel assembly opening 500a, a water inlet 500b connected to the passageway 120 by a valve 510, and a water outlet 500c connected to the fuel pool 160 via a valve 520. The canister 500 also includes a lid 540 that may be selectively opened and closed (e.g., manually or automatically) to uncover and cover the opening 500a. The device 30 also includes a passageway 560 that leads from an upper, interior end of the canister 500 to a vacuum pump 570 and detector 580 disposed outside of the pool 160. According to various embodiments, the pump 570 and radiation detector 580 may be mounted to the frame 85. According to various embodiments, the sipping device 30 works in substantially the same manner as conventional sipping devices, except that water from the water treatment device 20 is used to flush and fill the canister 500.

A sipping device control system 590 connects to various components of the sipping device 30 such as the valves 510, 520, the pump 570, and the detector 580, to turn these components on or off at the appropriate times in the sipping cycle. The control system 590 may be connected to or integrally formed with the control system 90 of the water treatment device 20 to ensure that the water treatment device 20 is operated at the desired points in the sipping cycle.

According to various embodiments, the sipping cycle proceeds through the following sequential steps:
1) With the canister 500 disposed in the pool 165 and the lid 540 open, a fuel assembly 600 is loaded into the canister 500 through the opening 500a.
2) The lid 540 of the canister 500 is then closed, isolating the water in the canister 500 from the pool 160.
3) Pool water is degassed/filtered by running it through the water treatment device 20 and then providing the clean/degassed water to the canister 500.
4) With the valves 510, 520 open, the canister 500 is flushed with clean/degassed water provided by the water treatment device 20. Water is pumped into the canister 500 through the inlet 500b, downward, and out through the outlet 520, thereby flushing ambient (and potentially fission-gas-laden) pool water out of the canister 500. The volume of water being degassed and pumped into the canister 500 through the inlet 500b may be at least one or at least two times the total volume of the inside of the canister 500 to provide improved flushing of ambient, potentially fission-gas-laden pool water out of the canister 500 before the sipping procedure begins. The canister 500 pressure may be maintained at or near normal pool ambient pressure during the flush to avoid extracting fission gas from a leaking fuel assembly 600 during the flush.
5) Air is pumped into the top of the canister to form a bubble (e.g., a several inch tall air gap at the top of the interior of the canister 500).
6) The water valves 510, 520 are closed to seal the canister 500.
7) Some of the air bubble is pumped out of the air space at the top of the canister 500 via the pump 570 and passageway 560, thereby reducing the canister 500 internal pressure.
8) The reduction of pressure inside the canister 500 draws fission gas out of any cladding leaks in the fuel assembly 600 and into the canister 500 water.

9) Fission gases migrate to the air bubble at the top of the canister 500, are drawn out of the canister 500 by the vacuum pump 570, and are measured by the radiation detector 580.

10) At the end of the cycle, the canister lid 540 is opened and fuel assembly 600 is removed from the canister 500.

According to various embodiments, various of these steps may be omitted or reordered without deviating from the scope of the present invention. For example, steps 5 and 6 may be switched in order. Steps 3 and 4 may occur simultaneously (or an intermediate buffer tank in the passageway 120 may be used). Steps 7-9 may occur simultaneously.

According to various embodiments, the degassing process performed by the water treatment device 20 and flushing the canister 500 with clean/degassed water reduces the background level of fission gases and provides a lower, more stable fission gas background level than if the flush water from the fuel pool 160 were not degassed. This results in a higher signal-to-noise ratio in the detector 580, which may result in an improved failure detection accuracy and/or the ability to detect smaller failures in the fuel assembly 600 being tested.

According to various embodiments, the system 10 and its use may be modified in one or more of the following ways without deviating from the scope of the present invention. For example, the module 70 and gas transfer membranes 250 may be substituted by an alternate gas transfer component such as a spray degasser or column degasser. For example, "Membrane Contactors: An Introduction to the Technology," Ultrapure Water® May/June 1996—UP130427, discloses a method for extracting fission gasses from waste water, which may be used in place of the module 70 without deviating from the scope of the present invention.

All or some of the components of the water treatment device 20 may be submersible in the pool 160. For example, according to various embodiments, the module 70 and pump 50 may be mounted to the canister 500 and submerged in the pool 160. This may facilitate the shortening or elimination of the passageways 100, 120. The strip gas passageways 70*c*, 70*d* may be lengthened.

As shown in FIG. 1, a reservoir or buffer tank 620 may be disposed in the passageway 120 for storage of cleaned/degassed water to support a higher flushing flow rate or multi-pass treatment of pool water. For example, a lower throughput water treatment device 20 may continuously fill the reservoir 620, and cleaned/degassed water in the reservoir 620 may be intermittently used to flush the canister 500 by opening the valve 510. The resulting flushing may be at a higher volumetric flow rate than would be possible if the flushing flow rate was limited to the flow rate possible from the pump 50 and module 70.

According to various embodiments, the various water passageways 100, 110, 120 and gas passageways 130, 140 may comprise any type of suitable passageways (e.g., rigid or flexible hoses, pipes, etc.).

According to an alternative embodiment, the water treatment device 20 may be used without the sipping device 30 such that the device 20 continuously degasses the water in the pool 160 by sucking gas-laden water out of the pool through the passageway 100, degassing the water, and returning the water to the pool 160 through the open outlet end of the passageway 120. Such continuous degassing may improve the sensitivity of a standalone canister sipping device 30 (or other fuel assembly leak detection device (e.g., a telescope leak detection device) by lowering the ambient fission gas concentration in the pool 160 water.

As used herein, the terms "clean water," "degassed water," "filtered water" and the like refer to water that has been filtered to reduce the concentration of gasses (e.g., fission gases) therein. Such water is still considered clean/degassed/filtered even if it is not completely devoid of dissolved gases such as fission gases. According to various embodiments, the water treatment device 20 removes at least 5, 10, 20, 30, 40, 50, 60, 70, 80, 90, 95, and/or 99% of the fission gases originally present in the water such that the degassed water has at least 5, 10, 20, 30, 40, 50, 60, 70, 80, 90, 95, and/or 99% less fission gases than before the filtering/degassing. As discussed above, various techniques may be used to increase the degree of filtering/degassing (e.g., the use of larger or sequential modules 70 and/or additional degassing equipment).

Figure 3:
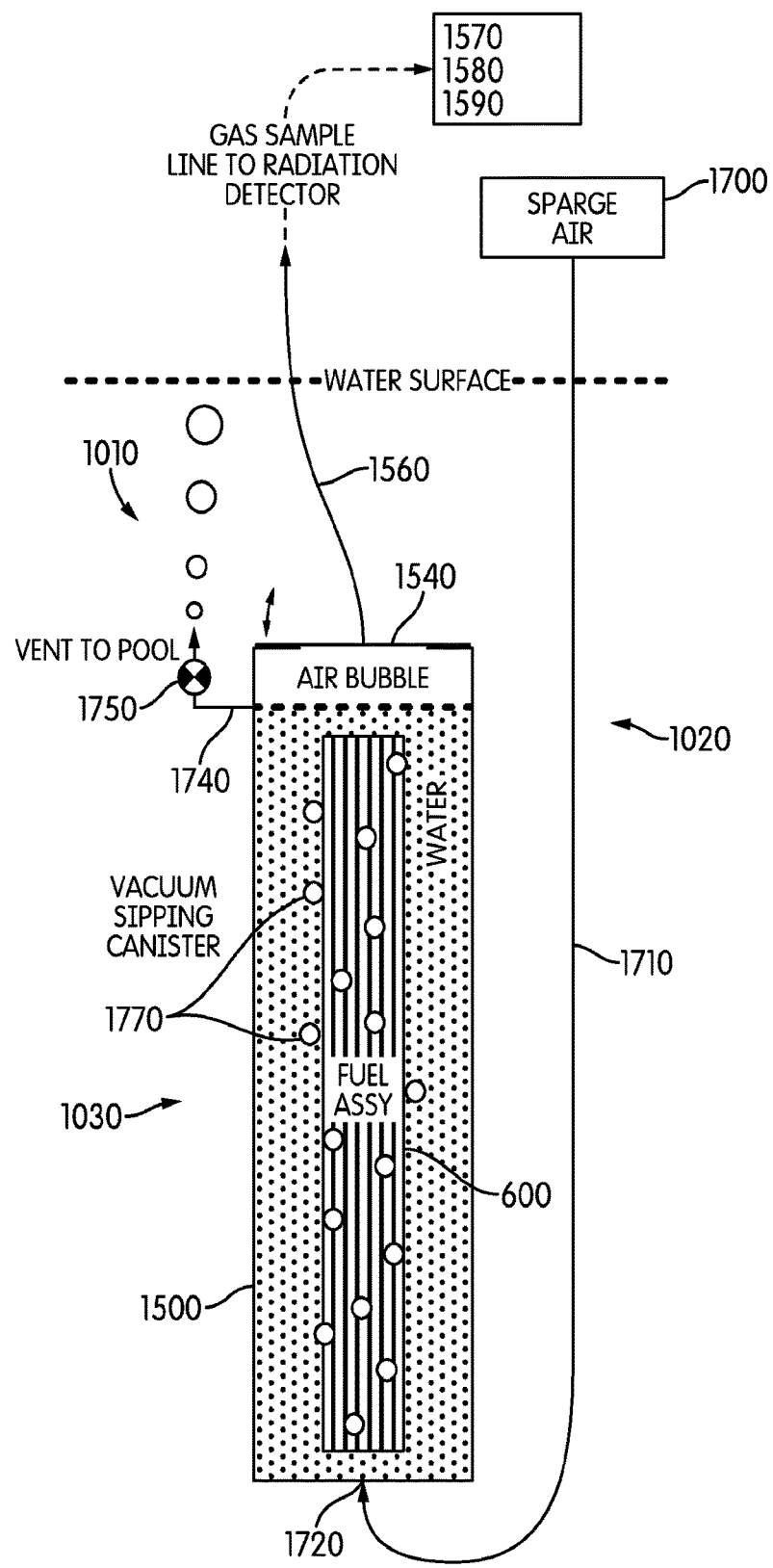
FIG. 3 is a block-diagram of a vacuum canister sipping system according to an alternative embodiment in which fission gasses are removed from the sipping canister by gas sparging water within the canister.

FIG. 3 illustrates a vacuum canister sipping system 1010 according to an alternate embodiment of the present invention. The system 1010 is substantially similar to the system 10, except that the system 1010 uses an alternative water treatment device 1020 that degasses the water already in the canister, rather than degassing water outside of the canister.

The system 1010 includes a sipping device 1030 that is substantially similar to or identical to the above-discussed sipping device 30. As with the device 30, the sipping device 1030 includes a canister 1500 and a passageway 1560 that leads from an upper, interior end of the canister 1500 to a vacuum pump 1570 and detector 1580 disposed outside of the pool. The sipping device 1030 also includes a control system 1590. These features of the sipping device 1030 are substantially similar or identical to the above-discussed features of the sipping device 30. Accordingly, a redundant description of similar or identical features is omitted.

The water treatment device 1020 comprises an air sparging system 1020 connected to the canister 1500. The air sparging system 1020 comprises a sparge air supply 1700 (e.g., a tank of compressed sparge air; a compressor configured to compress ambient air to provide pressurized sparge air, etc.). In the illustrated embodiment, the sparge gas comprises air. However, according to various alternative embodiments, the sparge gas may comprise any other type of suitable gas into which fission gasses can diffuse. The system 1020 includes a sparge gas supply line 1710 that extends from the sparge gas supply 1700 to a sparge gas inlet 1720 at or near the bottom of the canister 1500. The sparge gas inlet 1720 may lead into a gas diffuser that separates the sparge gas into small bubbles 1770.

As shown in FIG. 3, the system 1020 also includes a sparge gas outlet passageway 1740 connected the canister 1500 at or near the top of the canister 1500. The outlet passageway 1740 may open directly into the fuel pool so that fission-gas-laden sparge gas can vent into the pool or may lead to a filter/scrubber or other waste treatment device. A valve 1750 is connected to the outlet 1740. The valve 1750 may comprise a check-valve that permits sparge gas to exit the canister through the outlet 1740, while preventing liquid or gas from entering the canister 1500 via the outlet 1740 when the system 1010 applies a vacuum within the canister 1500. Additionally and/or alternatively, the valve 1750 may comprise a valve that is controlled by the control system 1590 so that the control system 1590 closes the valve 1750 before a vacuum is applied to the canister 1500 during the sipping procedure. According to various embodiments, the outlet passageway 1740 comprises an instrument cluster side port in the canister 1500.

According to various alternative embodiments, the outlet 1740 and valve 1750 are omitted altogether, and sparge gas that has bubbled through the canister 1500 and absorbed fission gasses is removed from the canister 1500 via the passageway 1560.

As shown in FIG. 3, sparge gas is introduced into the canister 1500 by the water treatment device 1020 after the fuel assembly 600 is loaded and the canister lid 1540 is closed. As bubbles 1770 of sparge gas rise within the sipping canister 1500, fission gasses diffuse into the bubbles 1770 and are carried to the top of the canister 1500. The sparge gas exits to the pool via the outlet 1740, and/or to the sipping system detection unit 1580 via the gas sample line 1560.

Pressure inside the canister 1500 is preferably maintained at or near local ambient pressure within the fuel pool during the sparging process to prevent or limit the escape of fission gasses from a leaking fuel assembly 600. Venting the sparge gas out of the canister 1500 via the outlet 1740 and/or passageway 1560 may allow some or all of the sparge gas to escape and maintain the pressure inside the canister 1500 at close to ambient. Alternatively, the rates of air sparging and gas sampling may be actively controlled by the control system 1590 to maintain canister 1500 pressure at the desired conditions. According to various embodiments, the control system 1590 is operatively connected to the water treatment device 1020 so as to control the water treatment device 1020 (e.g., by controlling the timing and rate at which sparge gas is introduced into the canister 1500 and the timing and rate at which sparge gas is allowed to exit the canister via the outlet 1740 and/or passageway 1560).

Sparging may continue for a predetermined duration sufficient to extract the desired fraction of fission gasses from the canister water. Alternatively, sparging may continue until the radioactivity of sparge air exiting via the gas sample line 1560 reaches a desired level, as detected by the detector 1580.

After background fission gasses have been reduced enough to achieve the desired reduction in dissolved fission gas concentration, the sipping cycle continues similarly to existing sipping systems except that the background radioactivity measurements are lower than if sparging had not been performed, and leaking assemblies 600 are easier to identify.

According to various embodiments, the system 1010 operates as follows (one or more steps of which may be automated via the control system 1590):

1. A fuel assembly 600 is placed in the canister 1500 and the lid 1540 is closed such that ambient fuel pool water surrounds the fuel assembly 600 within the canister 1500.
2. Sparge gas is fed from the sparge gas supply 1700 through the passageway 1710 and into the canister via the inlet 1720.
3. The sparge gas bubbles 1770 float up through the canister water, absorbing fission gases along the way.
4. The fission-gas-laden gas bubbles 1770 are vented into the pool (or waste treatment device) via the vent line 1740 or vented into the ambient environment (or a waste treatment device) via the detector 1580.
5. According to various embodiments, the fission-gas-laden gas bubbles 1770 are vented through the detector 1580 while the detector 1580 is used to detect the radioactivity of the fission-gas-laden gas bubbles 1770. Gas sparging may continue for a predetermined amount or time (e.g., at least 30, 60, 90, 120, 240, 300, 360, 600, 1200, 2400, and/or 4800 seconds or more) or may continue until the detector 1580 detects that the radioactivity of the fission-gas-laden gas bubbles 1770 has fallen below a predetermined threshold (e.g., less than 10, 25, 50, 100, 500, 1,000, 2,000, and/or 5,000 counts per second). Alternatively, gas sparging may continue until a radioactivity/fission gas concentration in the canister water is reduced by a predetermined threshold (e.g., at least 20, 30, 40, 50, 60, 70, 80, 90, 95, and/or 99% relative to an initial concentration of the fission gas in the canister water). The chosen threshold or time may be chosen by balancing the desired amount of time to be provided for fission gas removal against the corresponding improvement in leak detection.
6. Gas bubbles 1770 are allowed to float up to gas bubble/pocket at the top of the canister 1500. This gas bubble/pocket is sampled by the detector 1580, and the detected fission gasses/radiation is used as a baseline ambient radiation level for the subsequent sipping procedure.
7. The sipping procedure then begins by subjecting the canister 1500 to a vacuum pressure that causes fission gas to leak from leaks in the fuel assembly 600 (if present) into the canister water, float into the gas bubble, and be detected by the detector 1580. Increases in detected radiation/fission gasses relative to the baseline radiation detected in the above step are attributable to fuel assembly 600 leak(s), rather than to ambient fission gas in the canister 1500.

According to various embodiments, various of these steps may be omitted or reordered without deviating from the scope of the present invention.

Figure 4:
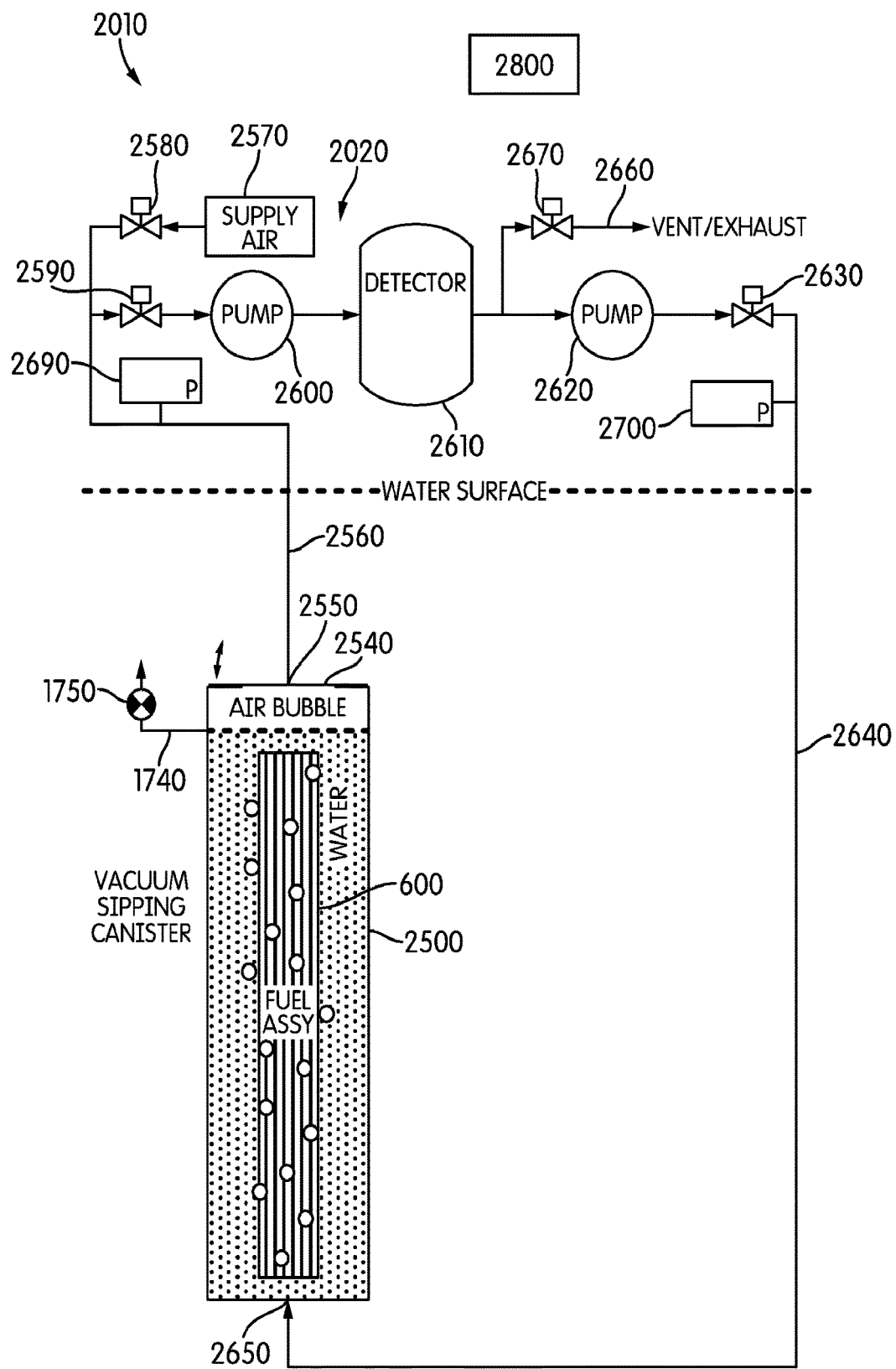
FIG. 4 is a block-diagram of a vacuum canister sipping system according to an alternative embodiment in which carrier gas recirculates through the canister to equilibrate with the dissolved gas composition of the canister water prior to the application of vacuum.

The above-discussed embodiments (e.g., systems 10, 1010) improve leak detection by removing fission gases from the water in the canister during the sipping procedure, thereby reducing the extent to which fission gases in the water contaminate the air bubble being sampled. FIG. 4 illustrates a vacuum canister sipping system 2010 according to an alternate embodiment. In this embodiment, leak detection sensitivity is improved by preventing fission gas that is present in the canister water from altering the concentration-based radioactivity of the gas bubble during the vacuum sipping procedure. This is because fission gasses that are released from the canister water into the gas bubble during the vacuum sipping procedure are released in proportion to dissolved gas (e.g., air) that is also in the canister water because the concentrations are equilibrated. The matching equilibrated release of such fission gasses and air reduces or eliminates the extent to which such release impacts the radioactivity detected by the detector.

Conventional sipping procedures involve forming a clean gas bubble in the canister over the fuel assembly. The air bubble is formed from plant air, which is relatively reliably low in radioactivity/fission gasses. The air bubble is formed with this clean air at the start of the sipping procedure. The canister is then subjected to a vacuum pressure, which causes fission gases to leak into the canister water through any leaks in the fuel assembly. This leaked fission gas floats up and into the air bubble at the top of the canister. Samples of the air bubble are detected over time by a fission gas detector. At the start of the procedure, the air going through the detector is just clean air from the air bubble. As fission gasses leak out of any holes in the fuel assembly, the fission gas concentration in the air bubble gradually rises, and that rise is detected by the detector as a leak. However, as the procedure progresses, dissolved fission gasses that were already in the canister water come out of solution and mix with the air in the bubble space to increase the radioactivity/fission gas concentration of that air bubble. Thus, even when there is no leaking assembly, there is a gradual increase in the activity observed by the detector because background fission gasses are gradually extracted from the water volume. At the same time, if there is a leaking assembly it will increase the inventory of fission gas in the canister. The determination of a leak requires that this increase in inventory is sufficiently large as to be noticeable relative to the expected gradual increase in radioactivity caused by the ambient fission gasses already in the canister water. The results of the sipping procedure can be compared to the results of a control sipping procedure in which a fuel assembly is not disposed in the canister according to various embodiments. However, such use of an initial control can lead to errors based on, for example, (1) variations in fission gas concentrations in different batches of fuel pool water that are disposed in the canister during the sipping procedure, and/or (2) an artificial local increase in the fission gases in the canister water as a result of residual fission gas remaining in the canister from a prior test of a leaking fuel assembly.

The system 2010 is configured to reduce the extent to which the concentration of fission gasses in the air bubble and gas sample loop are influenced by the action of dissolved gasses coming out of solution within the canister during the vacuum sipping procedure.

As shown in FIG. 4, the system 2010 includes a canister 2500 and lid 2540 that are substantially similar or identical to the canister 1500 and lid 1540 of the system 1010.

As shown in FIG. 4, the system 2010 incorporates a controlled carrier gas recirculation loop 2020. An outlet port 2550 connects at or near the top of the canister 2540 and opens into a passageway 2560. A carrier gas supply 2570 connects to the passageway 2560 via a valve 2580. The loop 2020 progresses sequentially from the passageway 2560 through a valve 2590, a pump 2600, a detector 2610 (similar or identical to the detector 580), a pump 2620, a valve 2630, and a passageway 2640, which connects to an inlet 2650 into the canister 2500 at or near the bottom of the canister 2500. A vent/exhaust passageway 2660 connects, by way of a valve 2670 to the loop 2020 between the detector 2610 and pump 2620. Pressure sensors 2690, 2700 are operatively connected to the passageways 2560, 2640, respectively.

The carrier gas supply 2570 may comprise any suitable supply of air or other suitable gas (e.g., a compressor that compresses ambient plant air for use in the system 2010; a compressed air tank).

According to various embodiments, the system 2010 includes a control system 2800 that operatively connects to the various valves 1750, 2580, 2590, 2670, 2630, sensors 2690, 2700, pumps 2600, 2620, and detector 2610 to control the operation of the system 2010. According to various embodiments, the control system 2800 is configured to automatically undertake some or all of the sipping procedure once the fuel assembly 600 is placed inside the canister 2500.

According to various embodiments, the system 2010 is operated (e.g., by the control system 2800) as follows:

1. A fuel assembly 600 is placed in the canister 2500 and the lid 2540 is closed such that ambient fuel pool water surrounds the fuel assembly 600 within the canister 2500.
2. Carrier gas (e.g., air) is delivered from the carrier gas supply 2570 to the top of the canister 2500 (e.g., via the open valve 2580, passageway 2560, and outlet 2550, or via the loop 2020 and passageway 2640).
3. The valve 2580 is closed (if not already closed) and the valves 2590, 2630 are opened (if not already open) so that the loop 2020 forms a continuous recirculation loop. The valve 2670 may be opened or closed (e.g., the valve 2670 may be opened to (1) maintain an ambient pressure in the detector 2610 to avoid damage to the detector 2610, and/or (2) avoid pressure fluctuations that could affect detector measurement accuracy/consistency). One or more of the pumps 2600, 2620 are operated to pump the carrier gas around the loop 2020 (in a clockwise direction as shown in FIG. 4), which causes the carrier gas to continuously recirculate through the canister water. Pressure within the canister 2500 is preferably maintained at or around the ambient pressure of the fuel pool so that fission gasses do not leak from a leaky fuel assembly 600 into the canister water during this recirculation step.
4. Radioactivity/fission gases in the carrier gas are continuously monitored by the detector 2610 during the recirculation. As ambient fission gasses in the canister water diffuse into the recirculating carrier gas, fission gas concentration in the recirculating carrier gas rises and is detected by the detector 2610.
5. Eventually, the fission gas concentration in the recirculating carrier gas reaches or approaches a steady state equilibrium, which is detected by the detector 2610 because the detected concentration stops increasing or increases at a slow rate.
6. Once the equilibrium is reached or approached, the actual sipping procedure test is conducted by applying a vacuum pressure to the canister 2500 while continuously sampling the carrier gas disposed in the gas bubble at the top of the canister 2500 via the detector 2610 and opening the valve 2670 to facilitate flow of the carrier gas from the gas bubble to the detector 2610 via the passageway 2560. The valves 1750, 2580, 2630 may be closed during this step. With the vacuum applied, if the fuel assembly 600 has a leak, fission gas will leak out of the fuel assembly 600, float into the bubble of carrier gas, and be detected by the detector 2610 as an increase in radioactivity relative to the baseline radioactivity of the carrier gas in the bubble once equilibrium was reached/approached. Additionally and/or alternatively, the valve 2630 may be opened and recirculation of the carrier gas may continue during the vacuum sipping procedure, which may improve leak detection by encouraging fission gas that is leaked into the canister water to be absorbed into rising carrier gas bubbles and then be detected in the detector 2610. Because the radioactivity of the carrier gas and dissolved gas mixture in the canister water is already near equilibrium, there is little or no change in carrier gas composition when dissolved gasses come out of solution upon application of vacuum during the time period during which the actual sipping procedure is performed. Thus, an observed change in carrier gas composition (e.g. in increase in fission gas concentration) during the application of vacuum is more reliably attributable to the presence of a leak in the fuel assembly 600, and not to the presence of ambient dissolved fission gas in the canister water.

According to various embodiments, various of these steps may be omitted, modified, or reordered without deviating from the scope of the present invention.

As discussed above, the recirculation step continues until the detected radiation in the recirculating carrier gas reaches or approaches equilibrium. The terms "reaches" and "approaches" do not require an absolute equilibrium. Rather, they are used to identify a proximity to equilibrium. For example, as used herein, equilibrium is reached or approached when the rate of increase in detected radioactivity in the recirculating carrier gas falls below a predetermined threshold (e.g., less than a 1, 2, 3, 4, 5, 10, 15, 20, 30, and/or 40% increase in radioactivity/fission gas concentration over a predetermined time period (e.g., 1, 2, 5, 10, 20, 30, 60, 90, 120, 600, 1200 seconds)).

According to various embodiments, the fission gas removal features of the systems 10, 1010 and the equilibrium-based leak-detection sensitivity of the system 2010 are combined. For example, such a hybrid approach can be accomplished using the system 2010. To reduce the absolute amount of ambient fission gas in the canister water after the fuel assembly 600 is placed in the canister 2500 and the lid 2540 closed, sparge gas is fed from the supply air 2570 through the valve 2590, pump 2600, detector 2610, pump 2620, valve 2630, passageway 2640, and inlet 2650 to introduce the sparge gas/air into the canister 2500. As the sparge gas bubbles float up through the canister water, they absorb fission gasses from the canister water. The fission-gas-laden air is then vented from the system 2010 via the vent 1740 and valve 1750. Thus, the fission gas removal step functions in a manner similar to the fission gas removal step of the system 1010. According to alternative embodiments, a membrane filter such as the filter 70 from the system 10 may be incorporated into the system 2010 to reduce the absolute fission gas concentration in the canister 2500 water.

After the absolute fission gas concentration in the canister water is reduced via gas sparging and venting and/or filtering, the system 2010 progresses through its equilibrium and sipping steps as discussed above. However, the reduced absolute fission gas concentration in the canister water reduces the fission gas concentration in the air bubble at equilibrium, which may improve the system's leak detection sensitivity because a leak-based increase in radioactivity/fission gas concentration is larger relative to the background radioactivity/fission gas concentration in the gas bubble being sampled.

The foregoing illustrated embodiments are provided to illustrate the structural and functional principles of embodiments of the present invention and are not intended to be limiting. To the contrary, the principles of the present invention are intended to encompass any and all changes, alterations and/or substitutions within the spirit and scope of the following claims.

What is claimed is:

1. A canister sipping system comprising:
a canister vacuum sipping device comprising a canister, the canister vacuum sipping device being configured to detect a failure in a nuclear fuel assembly disposed in the canister by detecting fission gas leaking from the fuel assembly during a vacuum sipping procedure of the canister vacuum sipping device; and
a water treatment device connected to the canister and configured to create degassed water, the water treatment device comprising:
a gas transfer membrane that is configured to extract fission gases and dissolved air out of fuel pool water that has been extracted from a fuel pool to form the degassed water, and
a vacuum pump operatively connected to the gas transfer membrane and configured to draw air from an air source and provide the air at a partial vacuum pressure to the gas transfer membrane for use as a strip gas,
wherein the water treatment device is configured to provide the degassed water within the canister prior to undertaking of the vacuum sipping procedure.

2. The canister sipping system of claim 1, wherein the water treatment device comprises:
a fluid pump that is configured to flush the degassed water through the canister after the nuclear fuel assembly is placed into the canister, thereby displacing at least a portion of the fuel pool water disposed within the canister with the degassed water.

3. The canister sipping system of claim 2, wherein the water treatment device and fluid pump are configured such that a volume of the degassed water being flushed into the canister is at least twice a volume of the canister.

4. The canister sipping system of claim 1, wherein the air source comprises ambient air from around the fuel pool.

5. The canister sipping system of claim 1, wherein the gas transfer membrane is configured to be used with borated fuel pool water and is configured to not remove boron from the borated fuel pool water.

* * * * *